Patented July 31, 1934

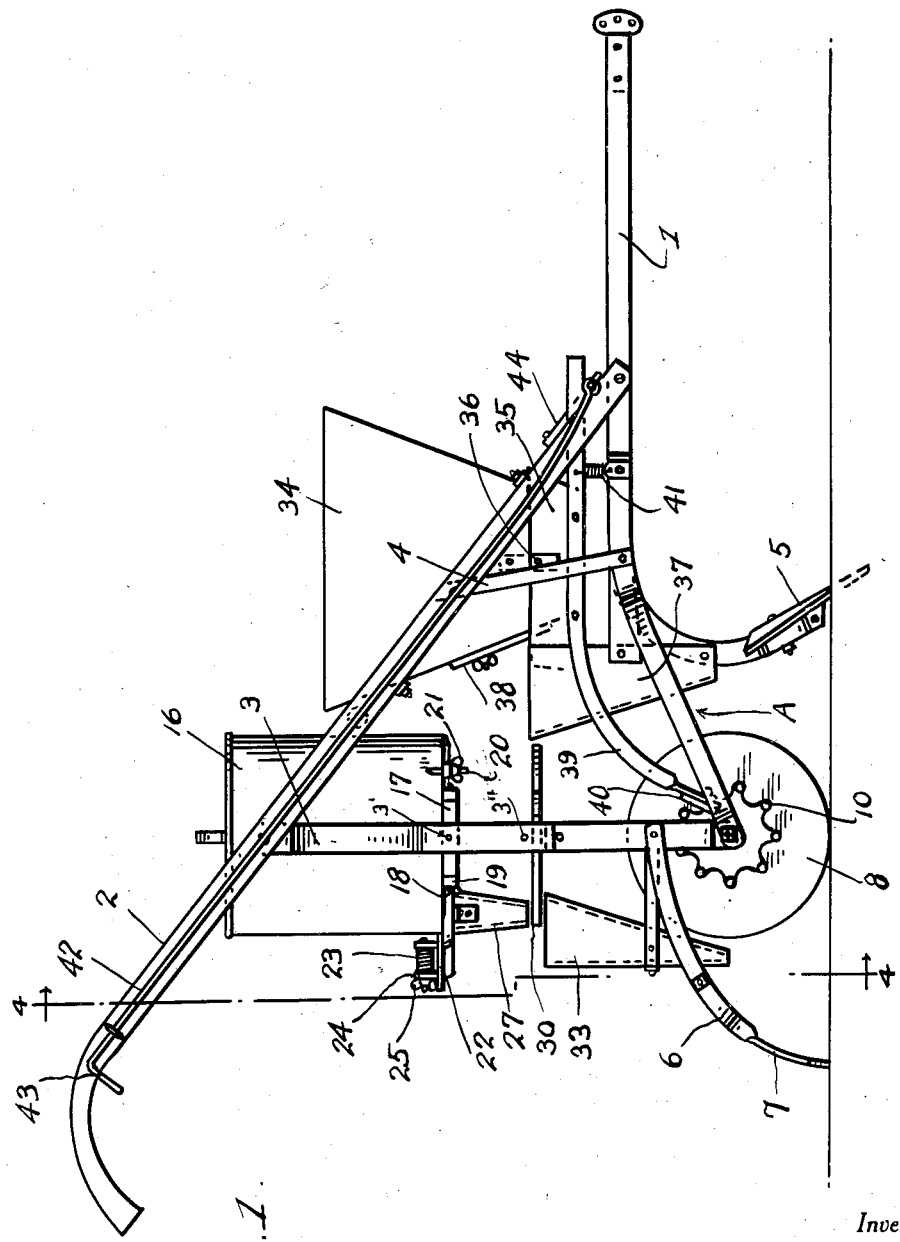

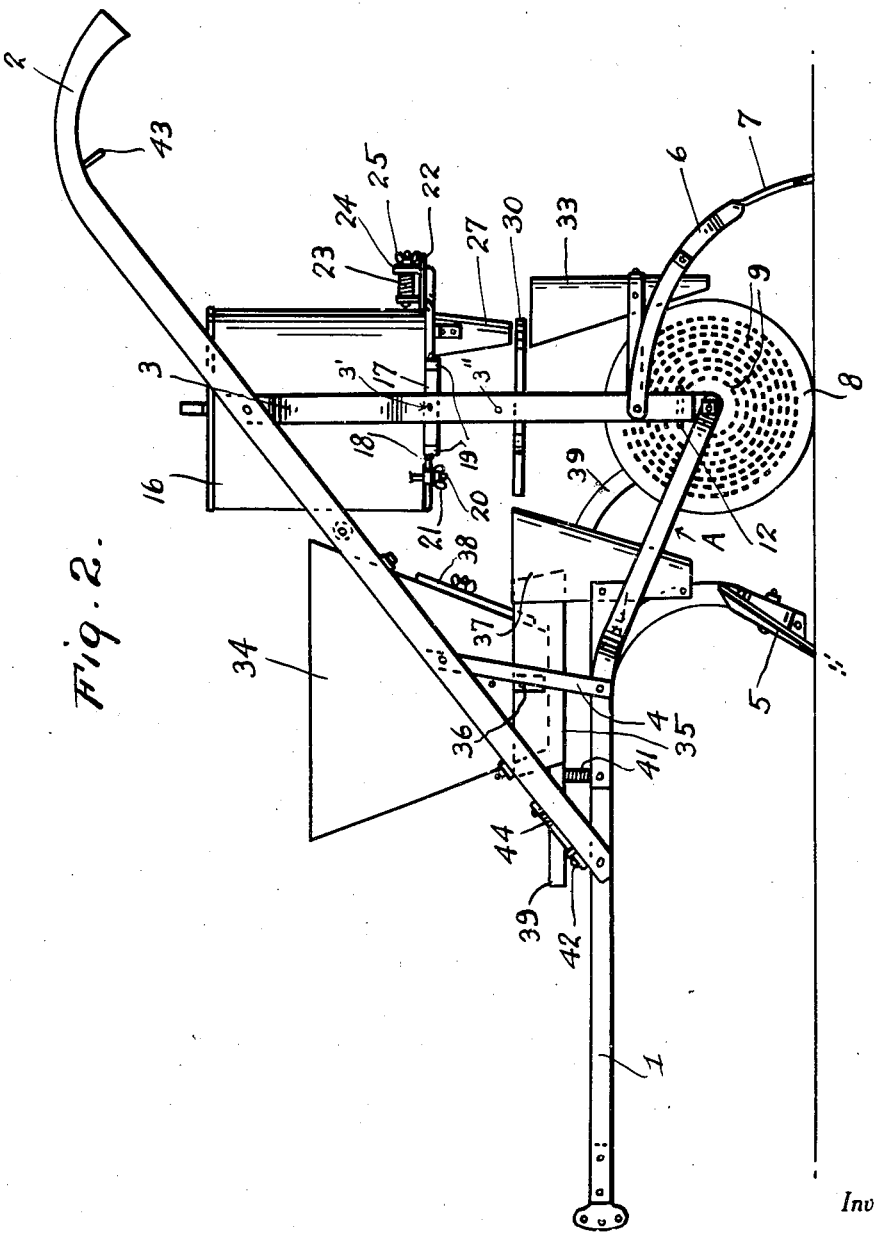

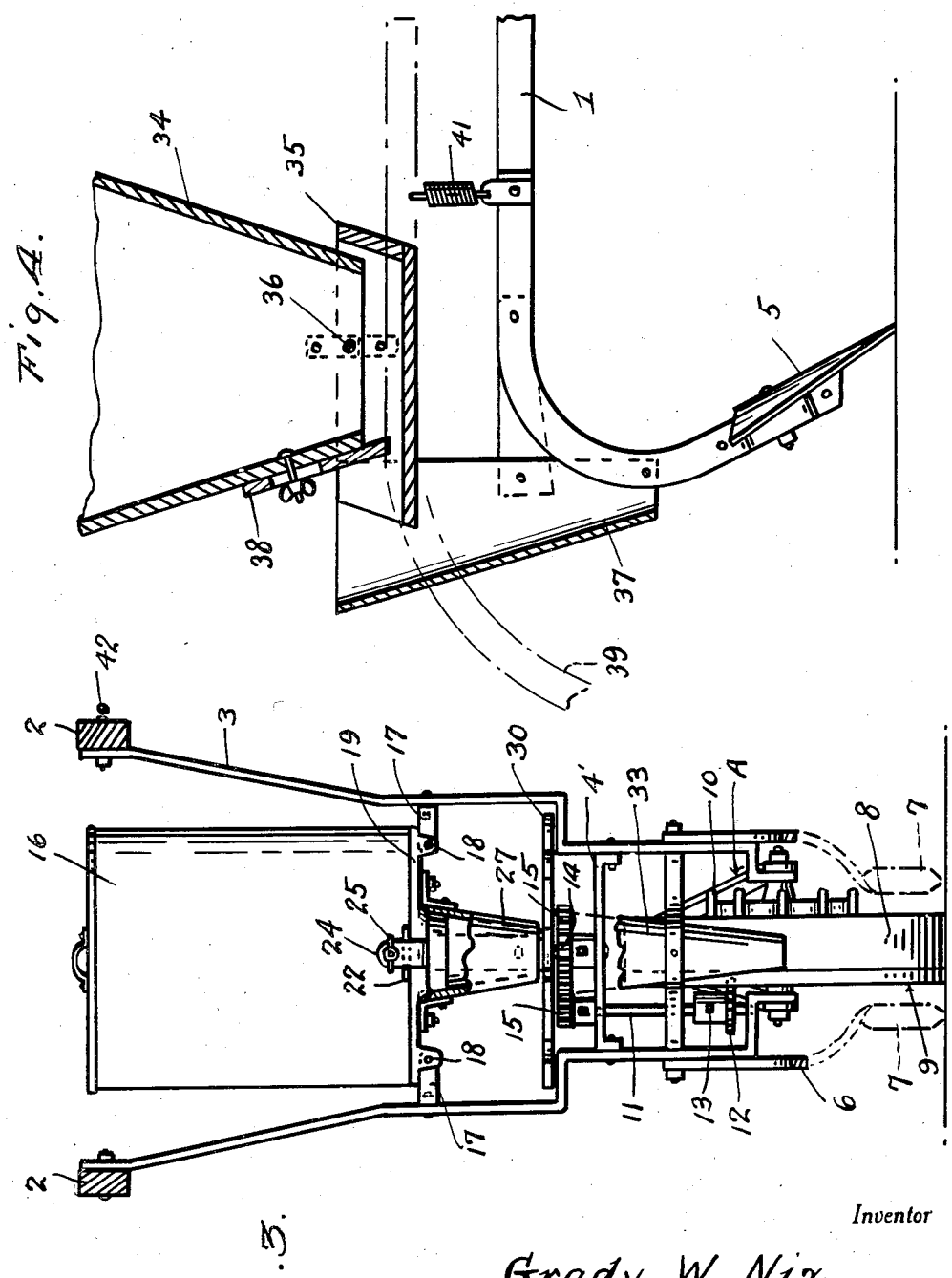

1,968,161

UNITED STATES PATENT OFFICE 1,968,161

SEED PLANTER AND FERTILIZER DISTRIBUTOR

Grady Woodfin Nix, Clem, Ga.

Application August 26, 1932, Serial No. 630,578

2 Claims. (Cl. 111—73)

This invention relates to a seed planter and fertilizer distributor, the general object of the invention being to provide an implement which will open a furrow, distribute fertilizer therein, drop seed into the furrow and then cover the fertilizer and seed in one operation.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation looking toward one side of the implement.

Fig. 2 is an elevation looking toward the opposite side thereof.

Fig. 3 is a section on line 4—4 of Fig. 1.

Fig. 4 is a sectional detail view showing the fertilizer distributor means.

In these drawings, the letter A indicates the frame of the device which includes the beam 1, the handles 2, the uprights 3 and the braces 4. A plow 5 is attached to the downwardly curved inner end of the beam 1 and the shanks 6 of the covering plows 7 are attached to the lower parts of the uprights 3. A wheel 8 is rotatably supported at the lower ends of the uprights 3 and one face of this wheel is formed with a plurality of annular rows of recesses 9 and the other face is provided with the spaced lugs 10. A vertically arranged shaft 11 is journalled in a part of the frame and carries a toothed wheel 12 which is slidably arranged on the shaft and is held in adjusted position by a set screw 13. Thus this wheel can be placed in engagement with any one of the annular rows of recesses 9 in the wheel so that the shaft will be rotated from the wheel 8 at a speed in accordance with the particular row with which the toothed wheel 12 engages.

A vertically arranged shaft 14 is rotatably supported in the frame and gears 15 connect the shafts 11 and 14 together so that the shaft 14 is driven from the wheel 8. A seed hopper 16 has its bottom part removably attached to the brackets 17, extending inwardly from intermediate portions of the uprights, by the bolts 18 and the body of the hopper is detachably connected to the bottom forming part 19 by the bolts 20 attached to the body part and passing through perforations in the bottom part, and the nuts 21 engaging the bolts.

The bottom part 19 is provided with an opening 19' adjacent one edge thereof, and this opening is controlled by a gate 22 normally held partly in closed position by a spring 23 which has one end engaging an upright part 24 on the gate and a bolt and nut 25 is provided for adjusting the gate. Seed feeding means are located in the hopper and are controlled by the shaft 14, the seed controlling means also including a notched disk 30 which is located between the small hopper 27 and the large hopper 33. When the seed is to be broadcast in the furrow, this notched disk 30 is removed and the bolts of the brackets 17 are placed in the lower holes 3'' of the uprights 3 so that the small spout 27 extends into the large spout 33. When the seeds are to be dropped in hills, the parts are arranged as shown in Figures 1, 2 and 3, with the bolts of the brackets placed in the holes 3' of the uprights.

A fertilizer hopper is shown at 34 and is supported between the lower parts of the handles 2 and the trough 35 extends under the open lower end of the hopper and is pivoted at its sides to the sides of the hopper as shown at 36. The open end of the trough discharges into the distributor chute 37 which deposits the fertilizer into the furrow immediately in rear of the plow 5. A gate 38 controls the amount of fertilizer leaving the trough and said trough is given a rocking movement from the wheel 8 through means of the curved bar 39 attached to the trough and having its inner end curving downwardly and formed with a dog 40 which engages the lugs 10. Thus as the wheel 8 rotates the lugs 10 will engage the dog 40 so as to rock the bar 39 and the trough so that the fertilizer is agitated and thus causes it to flow evenly from the hopper and trough into the chute 37.

A spring 41 connects a front part of the bar 39 with the beam 1 and acts to return the parts to normal position after they have been moved by the lugs 10 engaging the dog 40. This bar 39 can be moved into inoperative position whenever desired through means of a long rod 42 slidably supported by one of the handles 2 and having its upper end bent to form a handle 43, with its other end attached to a pivoted bar 44 extending across the lower end of the handle and under the front end of the bar 39. Thus by pulling upwardly this bar 39 and the trough are rocked to a position where the dog 40 will not be engaged by the lugs 10.

Thus it will be seen that I have provided one implement for distributing seed and fertilizer into a freshly made furrow with the seed and fertilizer being immediately covered after being dropped into the furrow. By providing the means for driving the seed plate at different speeds, it is not necessary to provide a plurality of such plates and the seed and fertilizer can be regulated and due to the agitating effect of the rocking trough there is no danger of the fertilizer being clotted in the distributing means and the distribution is even and uniform.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. An agricultural implement comprising a plow beam, a plow share carried by the beam, handles connected to the beam, a supporting structure connected to the beam and handles, an axle carried by the supporting structure, a ground wheel secured to the axle, a fertilizer hopper carried by the handles, an agitating arm adjustably mounted on the handles, an agitating pan carried by the said arm and receiving fertilizer from the hopper, tension means carried by the said arm and beam, means for regulating the fertilizer from the hopper to the pan, a discharge spout carried by the supporting structure and receiving fertilizer from the pan and delivering it to a furrow formed by the plow share, seed distributing means carried by the supporting structure, means carried by the axle for vibrating the arm, and means carried by the supporting structure for covering the seeds and fertilizer.

2. An agricultural implement comprising a plow beam, a plow share carried by the beam, handles connected to the beam, a supporting structure connected to the beam and handles, an axle carried by the supporting structure, a ground wheel secured to the axle, a fertilizer hopper carried by the handles, an agitating pan pivotally supported from the fertilizer hopper and receiving fertilizer therefrom, an agitating arm connected with said pan and having its front part engaging a part on the handles, tension means carried by said arm and beam, means for regulating the fertilizer from the hopper to the pan, a discharge spout carried by the supporting structure and receiving fertilizer from the pan and delivering it to a furrow formed by the plow share, seed distributing means carried by the supporting structure, means for vibrating the arm by the wheel, and means carried by the supporting structure for covering the seeds and fertilizer.

GRADY WOODFIN NIX.